United States Patent
Flosbach et al.

(10) Patent No.: US 7,714,062 B2
(45) Date of Patent: May 11, 2010

(54) THERMAL CURABLE POWDER COATING COMPOSITION

(76) Inventors: Carmen Flosbach, Marpe 41, Wuppertal (DE) D-42287; Kristina Iland, Zeisbuschweg 1, Koeln (DE) D-51061; Tanja Renkes, Kathagen 32, Essen (DE) 45239

(*) Notice: Subject to any disclaimer, the term of this patent is extended or adjusted under 35 U.S.C. 154(b) by 202 days.

(21) Appl. No.: 12/002,695

(22) Filed: Dec. 18, 2007

(65) Prior Publication Data
US 2008/0152900 A1 Jun. 26, 2008

Related U.S. Application Data

(60) Provisional application No. 60/876,869, filed on Dec. 22, 2006.

(51) Int. Cl.
*B32B 5/16* (2006.01)
*B05D 1/12* (2006.01)
*C08G 18/00* (2006.01)

(52) U.S. Cl. ............ 524/589; 528/44; 528/45; 427/180; 428/327; 428/423.1; 524/507; 525/123; 525/453; 525/455

(58) Field of Classification Search ............ 524/589; 528/45; 427/180; 428/327
See application file for complete search history.

(56) References Cited

U.S. PATENT DOCUMENTS

| | | | | |
|---|---|---|---|---|
| 3,819,586 A | * | 6/1974 | Rudolph et al. | 528/45 |
| 3,849,160 A | * | 11/1974 | Dhein et al. | 427/485 |
| 4,247,666 A | * | 1/1981 | Mochizuki | 525/528 |
| 4,859,760 A | * | 8/1989 | Light et al. | 528/45 |
| 5,068,305 A | * | 11/1991 | Meixner et al. | 528/49 |
| 5,534,601 A | * | 7/1996 | Reuter et al. | 525/424 |
| 5,804,646 A | * | 9/1998 | Witte et al. | 524/590 |
| 5,852,101 A | * | 12/1998 | Halpaap et al. | 524/507 |
| 5,939,199 A | * | 8/1999 | Gras | 428/422.8 |
| 6,747,070 B2 | * | 6/2004 | Wenning et al. | 522/90 |
| 6,960,620 B2 | * | 11/2005 | Wenning et al. | 522/93 |
| 2002/0028948 A1 | * | 3/2002 | Wenning et al. | 548/266.8 |
| 2002/0114953 A1 | * | 8/2002 | Itou et al. | 428/413 |
| 2002/0156226 A1 | * | 10/2002 | Matsumoto et al. | 528/44 |
| 2003/0104217 A1 | * | 6/2003 | Wenning et al. | 428/423.1 |
| 2005/0003206 A1 | * | 1/2005 | Spyrou et al. | 428/423.1 |
| 2005/0085615 A1 | * | 4/2005 | Wenning et al. | 528/44 |
| 2005/0170185 A1 | * | 8/2005 | Facke et al. | 428/412 |
| 2005/0245718 A1 | * | 11/2005 | Roesler et al. | 528/45 |
| 2006/0047099 A1 | * | 3/2006 | Flosbach et al. | 528/75 |
| 2009/0155462 A1 | * | 6/2009 | Flosbach et al. | 427/180 |

FOREIGN PATENT DOCUMENTS

| | | | |
|---|---|---|---|
| EP | 410242 A | | 1/1991 |
| EP | 702040 A | | 3/1996 |
| EP | 1209182 A | | 5/2002 |
| EP | 1323757 A | | 7/2003 |
| GB | 1 465 286 | * | 2/1977 |
| WO | WO 95/35332 | | 12/1995 |
| WO | WO 01/25306 | | 4/2001 |
| WO | WO 02/50147 | | 6/2002 |

* cited by examiner

*Primary Examiner*—Marc S Zimmer
*Assistant Examiner*—Noah Frank
(74) *Attorney, Agent, or Firm*—Sudhir G. Deshmukh

(57) ABSTRACT

A powder coating composition comprising
(A) at least one hydroxyl functional polyurethane resin binder, and
(B) at least one polyurethane resin as cross-linking agent containing blocked isocyanate groups,
wherein the at least one hydroxyl functional polyurethane resin binder (A) and the at least one polyurethane resin (B) both having a melting temperature of 60 to 180° C., in particular, 80 to 160° C.; the powder coating composition makes it possible to achieve a low melt viscosity and an excellent processability along with a good storage stability and in particular, to form thin films of the coating layers having high flexibility in combination with an excellent weather resistance.

8 Claims, No Drawings

THERMAL CURABLE POWDER COATING COMPOSITION

CROSS REFERENCE TO RELATED APPLICATIONS

This application claims the benefit of U.S. Provisional Application Ser. No. 60/876,869 filed on Dec. 22, 2006 which is hereby incorporated by reference.

FIELD OF THE INVENTION

The present invention is directed to a powder coating composition based on specific polyurethane resins providing high flexibility in combination with excellent weather resistance of the coating layers and high processability of the powder coating compositions.

DESCRIPTION OF PRIOR ART

Epoxy, polyester and acrylic resin binders are well-known for the use in thermal curable powder coating compositions. For example, hydroxyl functional polyesters are curable with isocyanates to result in polyurethane powder coatings, see D. Bates, The Science of Powder Coatings, Volume 1, London, 1990, pages 56, 276-277, 282.

Combinations of different resin binders and curing agents are investigated to receive specific desired properties of the coatings on different substrate surfaces.

EP-A 1209182, EP-A 1323757 and WO 02/50147 refer to coating compositions based on specific urethane acrylates or a mixture of different polymers, for example, different urethane acrylates, wherein the compositions are cured by ultra violet (UV) radiation to provide coatings with good mechanical properties and flexibility.

Thermal curable powder coating compositions based on urethane (meth)acrylates or specific polyester urethanes are disclosed in WO 01/25306, EP-A 702040, EP-A 410242 and WO 95/35332 and refer to good storage stability and increased weather resistance of the coatings, but they do not offer a high processability of the powder coating compositions.

While current state of the art discloses powder coating compositions having good technology properties, they do not offer in particular the level of high flexibility in combination with a potential of building of thin films. Accordingly, there is a need for powder coating compositions, and methods of application thereof, that meet those requirements.

SUMMARY OF THE INVENTION

The present invention provides a powder coating composition comprising
(A) at least one hydroxyl functional polyurethane resin binder, and
(B) at least one polyurethane resin as cross-linking agent containing blocked isocyanate groups, wherein the at least one hydroxyl functional polyurethane resin binder (A) and the at least one polyurethane resin (B) both having a melting temperature of 60 to 180° C., in particular, 80 to 160° C.

The powder coating composition according to the invention comprising the combination of the specific kind of polyurethane resins with specific kind of blocked isocyanate groups makes it possible to achieve a low melt viscosity and an excellent processability along with good storage stability.

The powder coating composition according to the invention provides the desired technological properties, in particular, thin films and high flexibility in combination with an excellent weather resistance of the coating layers.

DETAILED DESCRIPTION OF THE INVENTION

The features and advantages of the present invention will be more readily understood, by those of ordinary skill in the art, from reading the following detailed description. It is to be appreciated those certain features of the invention, which are, for clarity, described above and below in the context of separate embodiments, may also be provided in combination in a single embodiment. Conversely, various features of the invention that are, for brevity, described in the context of a single embodiment, may also be provided separately or in any sub-combination. In addition, references in the singular may also include the plural (for example, "a" and "an" may refer to one, or one or more) unless the context specifically states otherwise.

Slight variations above and below the stated ranges of numerical values can be used to achieve substantially the same results as values within the ranges. Also, the disclosure of these ranges is intended as a continuous range including every value between the minimum and maximum values.

All patents, patent applications and publications referred to herein are incorporated by reference in their entirety.

Particularly the present invention refers to a powder coating composition comprising 5 to 95 wt %, preferably 20 to 80 wt %, more preferably 30 to 70 wt % of the at least one hydroxyl functional polyurethane resin binder (A), and 95 to 5 wt %, preferably 80 to 20 wt %, more preferably 70 to 30 wt % of the least one polyurethane resin (B), the wt % being based on the total weight of (A) and (B).

Both the components (A) and (B) have a melting temperature of 60 to 180° C., in particular 80 to 160° C. The melting temperatures are not in general sharp melting points, but instead the upper end of melting ranges with a breadth of, for example, 30 to 150° C.

The melting ranges and thus the melting temperatures may be determined, for example, by DSC (differential scanning calorimetry) at heating rates of 10 K/min.

The polyurethane resins (A) are hydroxyl-functional resins and have hydroxyl values of, for example, 30 to 300 mg KOH/g.

The production of hydroxyl-functional polyurethane resins is known to the person skilled in the art; in particular, they in general may be produced by reacting polyisocyanate(s) with polyol(s) in the excess.

Polyols suitable for the production of the polyurethane resins (A) are not only polyols in the form of low molar mass compounds defined by empirical and structural formula but also oligomeric or polymeric polyols with number-average molar masses of, for example, up to 800, for example, corresponding hydroxyl-functional polyethers, polyesters or polycarbonates. Low molar mass polyols defined by an empirical and structural formula are, however, preferred. The person skilled in the art selects the nature and proportion of the polyisocyanates and polyols for the production of polyurethane resins (A) in such a manner that polyurethane resins (A) with the above-mentioned melting temperatures are obtained.

All the number-average molar mass data stated in the present description are number-average molar masses determined or to be determined by gel permeation chromatography (GPC; divinylbenzene-crosslinked polystyrene as the immobile phase, tetrahydrofuran as the liquid phase, polystyrene standards).

The hydroxyl-functional polyurethane resins (A) may be produced in the presence of a suitable organic solvent (mixture), which, however, makes it necessary to remove the solvent from the resulted resins. Preferably, the production of the polyurethane resins (A) is carried out without solvent and without subsequent purification operations.

In a first preferred embodiment, the polyurethane resins (A) are polyurethane diols which can be prepared by reacting 1,6-hexane diisocyanate with a diol component in the molar ratio of x mol 1,6-hexane diisocyanate:(x+1) mol diol component, wherein x means a value from 2 to 6, preferably, from 2 to 4.

The diol component can be one single diol or a combination of diols, preferably two to four, in particular two or three diols, wherein in the case of a diol combination each of the diols preferably constitutes at least 10 mol % of the diols of the diol component. The diol component(s) can be (cyclo)aliphatic, aromatic or araliphatic diols. In particular, the one single diol is a (cyclo)aliphatic diol with a molar mass in the range of 62 to 600. In the case of a diol combination, it is preferred, that at least 70 mol %, in particular, 100 mol % of the diols are (cyclo)aliphatic diols, each with a molar mass in the range of 62 to 600.

The term "(cyclo)aliphatic" used in the description and the claims encompasses cycloaliphatic, linear aliphatic, branched aliphatic and cycloaliphatic with aliphatic residues. The aromatic or araliphatic diols comprise diols with aromatically and/or aliphatically attached hydroxyl groups.

Diols may furthermore comprise oligomeric or polymeric diols with number-average molar masses of, for example, up to 800, as described above.

Examples of diols which are possible as one single diol of the diol component are ethylene glycol, isomeric propane- and butanediols, 1,5-pentanediol, 1,6-hexanediol, 1,10-decanediol, 1,12-dodecanediol, 1,4-cyclohexanedimethanol, hydrogenated bisphenol A and dimer fatty alcohol. Examples of diols which are possible as constituents of the diol component are telechelic (meth)acrylic polymer diols, polyester diols, polyether diols, polycarbonate diols, each with a number-average molar mass of, for example, up to 800 as representatives of oligomeric or polymeric diols, bisphenol A as a representative of low molar mass non-(cyclo)aliphatic diols defined by empirical and structural formula and ethylene glycol, isomeric propane- and butanediols, 1,5-pentanediol, 1,6-hexanediol, 1,10-decanediol, 1,12-dodecanediol, neopentyl glycol, butylethylpropanediol, the isomeric cyclohexanediols, the isomeric cyclohexanedimethanols, hydrogenated bisphenol A, tricyclodecanedimethanol, and dimer fatty alcohol as representatives of (cyclo)aliphatic diols defined by empirical and structural formula with a low molar mass in the range of 62 to 600.

1,6-hexane diisocyanate and the diol component are preferably reacted together in the absence of solvents. The reactants may be reacted together simultaneously or in two or more synthesis stages. When the synthesis is performed in multiple stages, the reactants may be added in a varied order. The diol component may, for example, be divided into two or more portions, for example, such that 1,6-hexane diisocyanate is initially reacted with part of the diol component before further reaction with the remaining proportion of the diol component. The individual reactants may in each case be added in their entirety or in two or more portions. The reaction is exothermic and proceeds at a temperature above the melting temperature of the reaction mixture. The reaction temperature is, for example, 60 to 200° C. The molten reaction mixture may be maintained within the desired temperature range by heating or cooling. Once the reaction carried out is complete and the reaction mixture has cooled, solid polyurethane diols are obtained. When low molar mass diols defined by empirical and structural formula are used for synthesis of the hydroxyl functional polyurethane resins, their calculated molar masses are in the range of 522 or above, for example, up to 2200.

The resulted polyurethane resins assume the form of a mixture exhibiting a molar mass distribution, and they do not require working up and may be used directly as hydroxyl-functional polyurethane resins (A).

In a second preferred embodiment, the polyurethane resins (A) are polyurethane diols which can be prepared by reacting a diisocyanate component and a diol component in the molar ratio of x mol diisocyanate component:(x+1) mol diol component, wherein x means any desired value from 2 to 6, preferably, from 2 to 4, wherein 50 to 80 mol % of the diisocyanate component is formed by 1,6-hexane diisocyanate, and 20 to 50 mol % by one or two diisocyanates, each forming at least 10 mol % of the diisocyanate component and being selected from the group consisting of toluylene diisocyanate, diphenylmethane diisocyanate, dicyclohexylmethane diisocyanate, isophorone diisocyanate, trimethylhexane diisocyanate, cyclohexane diisocyanate, cyclohexanedimethylene diisocyanate and tetramethylenexylylene diisocyanate.

The mol % of the respective diisocyanates add up to 100 mol %.

Preferably, the diisocyanate or the two diisocyanates, forming in total 20 to 50 mol % of the diisocyanate component, are selected from dicyclohexylmethane diisocyanate, isophorone diisocyanate, trimethylhexane diisocyanate, cyclohexane diisocyanate, cyclohexanedimethylene diisocyanate and tetramethylenexylylene diisocyanate.

20 to 100 mol %, preferably of 80 to 100 mol %, of the diol component is formed by at least one linear aliphatic alpha,omega-C2-C12-diol, and 0 to 80 mol %, preferably of 0 to 20 mol %, by at least one diol that is different from linear aliphatic alpha,omega-C2-C12-diols and preferably, also from alpha,omega-diols with more than 12 carbon atoms. Each diol of the diol component preferably forms at least 10 mol % within the diol component, and the mol % of the respective diols add up to 100 mol % of the diol component. The diol component preferably consists of no more than four different diols, in particular only of one to three diols. In the case of only one diol, it accordingly comprises a linear aliphatic alpha,omega-C2-C12-diol. The at least one diol differing from linear aliphatic alpha,omega-C2-C12-diols and preferably, also from alpha,omega-diols with more than 12 carbon atoms comprises in particular (cyclo)aliphatic diols defined by empirical and structural formula with a low molar mass in the range of 76 to 600.

The proportion of possible non-(cyclo)aliphatic diols preferably amounts to no more than 30 mol % of the diols of the diol component. Preferably, the diol component does not comprise any non-(cyclo)aliphatic diols. Most preferably, it does not comprise any diols that are different from linear aliphatic alpha,omega-C2-C12-diols, but rather consists of one to four, preferably, one to three, and in particular only one linear aliphatic alpha,omega-C2-C12-diol.

Examples of linear aliphatic alpha,omega-C2-C12-diols that may be used as one single diol or as constituents of the diol component are ethylene glycol, 1,3-propanediol, 1,4-butanediol, 1,5-pentanediol, 1,6-hexanediol, 1,10-decanediol and 1,12-dodecanediol.

Examples of diols that are different from linear aliphatic alpha,omega-C2-C12-diols and may be used in the diol component are telechelic (meth)acrylic polymer diols, polyester diols, polyether diols, polycarbonate diols, each with a number-average molar mass of, for example, up to 800 as representatives of oligomeric or polymeric diols, bisphenol A as a representative of low molar mass non-(cyclo)aliphatic diols defined by empirical and structural formula and those isomers of propanediol and butanediol that are different from the isomers of propanediol and butanediol specified in the preceding paragraph, as well as, neopentyl glycol, butyl ethyl propanediol, the isomeric cyclohexanediols, the isomeric cyclohexanedimethanols, hydrogenated bisphenol A, tricyclodecanedimethanol, and dimer fatty alcohol as representatives of (cyclo)aliphatic diols defined by empirical and structural formula with a low molar mass in the range of 76 to 600.

The diisocyanates of the diisocyanate component and the diol or diols of the diol component are preferably reacted together as described above. Also the diisocyanate component may be divided into two or more portions or into the individual diisocyanates, for example, such that the hydroxyl components are initially reacted with part of the diisocyanate component and finally with the remaining proportion of the diisocyanate component. When low molar mass diols defined by empirical and structural formula are used for synthesis of the polyurethane diols, their calculated molar masses are in the range of 520 or above, for example, up to 2200.

The resulted polyurethane resins assume the form of a mixture exhibiting a molar mass distribution, and they do not, however, require working up and may be used directly as hydroxyl-functional polyurethane resins (A).

If, in individual cases, a proportion of the diol component used for the synthesis of those polyurethane resins (A) according to the preferred embodiments stated above is replaced by a triol component comprising at least one triol, polyurethane resins (A) are obtained which are branched and/or more highly hydroxyl-functional compared to the respective polyurethane resins stated above. Embodiments with such polyurethane resins (A) are themselves further preferred embodiments. For example, up to 70% of the diols of the diol component in molar terms may be replaced by the triol(s) of the triol component. Examples of triols are trimethylolethane, trimethylolpropane and/or glycerol. Glycerol is preferably used alone as a triol component.

The powder coating composition according to the invention comprises at least one polyurethane resin (B) as crosslinking agent. The polyurethane resins (B) have blocked isocyanate groups. Particularly, the blocked isocyanate groups may be converted back into free isocyanate groups at elevated temperature with elimination of the blocking agent and are then available as reaction partners for the corresponding functional groups of the at least one resin binder (A).

The latent isocyanate content of the polyurethane resins (B) is, for example, in the range from 2 to 21.2 wt %, calculated as NCO and relative to the corresponding underlying polyurethane resins which are free of blocking agent(s).

The production of polyurethane resins with blocked isocyanate groups is known to the person skilled in the art; in particular, they may be produced by reacting polyol(s) with polyisocyanate(s) in excess and reacting the excess free isocyanate groups with one or more blocking agents.

Polyols suitable for the production of the polyurethane resins (B) are polyols as those described for the production of the polyurethane resins (A). The person skilled in the art selects the nature and proportion of the polyisocyanates, the polyols and the blocking agents for the production of polyurethane resins B in such a manner that polyurethane resins (B) with the above-mentioned melting temperatures are obtained.

The polyurethane resins (B) may be produced in the presence of a suitable organic solvent (mixture), which, however, makes it necessary to remove the solvent from the resulted resins. Preferably, the production of the polyurethane resins (B) is carried out without solvent and without subsequent purification operations.

In a first preferred variant, the polyurethane resins (B) are polyurethanes with two blocked isocyanate groups per molecule which can be prepared by reacting 1,6-hexane diisocyanate with a diol component and with at least one blocking agent in the molar ratio x mol 1,6-hexane diisocyanate:x−1 mol diol component:2 mol blocking agent, wherein x means any desired value from 2 to 6, preferably, from 2 to 4.

The diol component can be the same diol or diol combination as those described above for the first preferred embodiment of polyurethane resins (A).

Examples for blocking agents that may be used alone or in combination are monofunctional compounds known for blocking isocyanates, such as, the CH-acidic, NH—, SH— or OH-functional compounds known for this purpose. Examples are CH-acidic compounds, such as, acetylacetone or CH-acidic esters, such as, acetoacetic acid alkyl esters, malonic acid dialkyl esters; aliphatic or cycloaliphatic alcohols, such as, n-butanol, 2-ethylhexanol, cyclohexanol; glycol ethers, such as, butyl glycol, butyl diglycol; phenols; oximes, such as, methyl ethyl ketoxime, acetone oxime, cyclohexanone oxime; lactams, such as, caprolactam; azole blocking agents of the imidazole, pyrazole, triazole or tetrazole type.

1,6-hexane diisocyanate, the diol(s) of the diol component and the at least one blocking agent are preferably reacted together in the absence of solvents in the same way as described for the first preferred embodiment of polyurethane resins (A), in general. The 1,6-hexane diisocyanate may be reacted, for example, initially with the blocking agent and then with the diol(s) of the diol component or initially with the diol(s) of the diol component and then with blocking agent. However, the diol component may, for example, also be divided into two or more portions, for example, also into the individual diols, for example, such that 1,6-hexane diisocyanate is reacted initially with part of the diol component before further reaction with blocking agent and finally with the remaining proportion of the diol component.

Once the reaction carried out in the absence of solvent is complete and the reaction mixture has cooled, solid polyurethanes with two blocked isocyanate groups per molecule are obtained. When low molar mass diols defined by empirical and structural formula are used for synthesis of the polyurethanes with two blocked isocyanate groups per molecule their calculated molar masses are in the range of 572 or above, for example, up to 2000.

The polyurethanes with two blocked isocyanate groups per molecule assume the form of a mixture exhibiting a molar mass distribution. The polyurethanes with two blocked isocyanate groups per molecule do not, however, require working up and may be used directly as polyurethane resins (B).

In a second preferred variant, the polyurethane resins (B) are polyurethanes with two blocked isocyanate groups per molecule which can be prepared by reacting a diisocyanate component, a diol component and at least one blocking agent in the molar ratio of x mol diisocyanate component:(x−1) mol diol component:2 mol blocking agent, wherein x means any desired value from 2 to 6, preferably, from 2 to 4, wherein 50 to 80 mol % of the diisocyanate component is formed by 1,6-hexane diisocyanate, and 20 to 50 mol % by one or two diisocyanates, each forming at least 10 mol % of the diisocyanate component and being selected from the group of diisocyantes as described above for the second preferred embodiment of polyurethane resins (A).

Preferably, the diisocyanate or the two diisocyanates, forming in total 20 to 50 mol % of the diisocyanate component, are selected from the group of preferred diisocyanates as described above for the second preferred embodiment of polyurethane resins (A).

20 to 100 mol %, preferably of 80 to 100 mol %, of the diol component is formed by at least one linear aliphatic alpha, omega-C2-C12-diol, and 0 to 80 mol %, preferably of 0 to 20 mol %, by at least one diol that is different from linear aliphatic alpha,omega-C2-C12-diols and preferably, also from alpha,omega-diols with more than 12 carbon atoms, as already described for the second preferred embodiment of polyurethane resins (A).

The portion of possible non-(cyclo)aliphatic diols, examples of linear aliphatic alpha,omega-C2-C12-diols and examples of diols different from linear aliphatic alpha, omega-C2-C12-diols can be the same as those described above for the second preferred embodiment of polyurethane resins (A).

Examples of the at least one blocking agent are the same as those listed above.

The diisocyanates of the diisocyanate component, the diol (s) of the diol component and the at least one blocking agent are preferably reacted together in the absence of solvents, in the same way as described for the first preferred embodiment of polyurethane resins (A), in general. For example, the diisocyanates of the diisocyanate component may be reacted initially with blocking agent and then with the diol(s) of the diol component or initially with the diol(s) of the diol component and then with blocking agent. However, the diol component may, for example, also be divided into two or more portions, for example, also into the individual diols, for example, such that the diisocyanates of the diisocyanate component are reacted initially with part of the diol component before further reaction with blocking agent and finally with the remaining proportion of the diol component. In a very similar manner, however, the diisocyanate component may, for example, also be divided into two or more portions, for example, also into the individual diisocyanates, for example, such that the diol component and blocking agent are reacted initially with part of the diisocyanate component and finally with the remaining proportion of the diisocyanate component.

Once the reaction carried out in the absence of solvent is complete and the reaction mixture has cooled, solid polyurethanes with two blocked isocyanate groups per molecule are obtained. When low molar mass diols defined by empirical and structural formula are used for synthesis of the polyurethanes with two blocked isocyanate groups per molecule, their calculated molar masses are in the range of 570 or above, for example, up to 2000.

The polyurethanes with two blocked isocyanate groups per molecule assume the form of a mixture exhibiting a molar mass distribution, and they do not, however, require working up and may be used directly as polyurethane resins (B).

In a third preferred variant, the polyurethane resins B are polyurethanes with blocked isocyanate groups which can be prepared by reacting a trimer of a (cyclo)aliphatic diisocyanate, 1,6-hexane diisocyanate, a diol component and at least one blocking agent in the molar ratio 1 mol trimer of a (cyclo) aliphatic diisocyanate:x mol 1,6-hexane diisocyanate:x mol diol component:3 mol blocking agent, wherein x means any desired value from 1 to 6, preferably, from 1 to 3.

The diol component is one single linear aliphatic alpha, omega C2-C12 diol or a combination of two to four, preferably, two or three, (cyclo)aliphatic diols, wherein in the case of diol combination, each of the diols makes up at least 10 mol % of the diols of the diol combination and the diol combination consists of at least 80 mol % of at least one linear aliphatic alpha,omega C2-C12 diol.

The trimer of the (cyclo)aliphatic diisocyanate is polyisocyanates of the isocyanurate type, prepared by trimerization of a (cyclo)aliphatic diisocyanate. Appropriate trimerization products derived, for example, from 1,4-cyclohexanedimethylenediisocyanate, in particular, from isophorondiisocyanate and more particularly, from 1,6-hexanediisocyanate, are suitable. The industrially obtainable isocyanurate polyisocyanates generally contain, in addition to the pure trimer, i.e., the isocyanurate made up of three diisocyanate molecules and comprising three NCO functions, isocyanate-functional secondary products with a relatively high molar mass. Products with the highest possible degree of purity are preferably used. In each case, the trimers of the (cyclo)aliphatic diisocyanates obtainable in industrial quality are regarded as pure trimer irrespective of their content of said isocyanate-functional secondary products with respect to the molar ratio of 1 mol trimer of the (cyclo)aliphatic diisocyanate:x mol 1,6-hexanediisocyanate:x mol diol:3 mol blocking agent.

Examples of one single linear aliphatic alpha,omega C2-C12 diol or linear aliphatic alpha,omega C2-C12 diols which can be used within the diol combination can be the same as those described above for the second preferred embodiment of polyurethane resins (A).

Examples of (cyclo)aliphatic diols which can be used within the diol combination in addition to the at least one linear aliphatic alpha,omega C2-C12 diol making up at least 80 mol % of the diol combination are the further isomers of propane and butane diol, different from the isomers of propane and butane diol cited in the preceding paragraph, and neopentylglycol, butylethylpropanediol, the isomeric cyclohexane diols, the isomeric cyclohexanedimethanols, hydrogenated bisphenol A and tricyclodecanedimethanol.

In the case of the diol combination, preferred diol combinations totaling 100 mol % in each case are combinations of 10 to 90 mol % 1,3-propanediol with 90 to 10 mol % 1,5-pentanediol, 10 to 90 mol % 1,3-propanediol with 90 to 10 mol % 1,6-hexanediol and 10 to 90 mol % 1,5-pentanediol with 90 to 10 mol % 1,6-hexanediol.

Examples of the at least one blocking agent are the same as those listed above.

The trimer of the (cyclo)aliphatic diisocyanate, 1,6-hexane-diisocyanate, the diol component and the at least one monofunctional blocking agent are preferably reacted together in the absence of solvents, in the same way as described for the first preferred embodiment of polyurethane resins (A), in general. For example, 1,6-hexane diisocyanate may be reacted initially with a mixture of diol component and blocking agent and then with the trimer of the (cyclo)aliphatic diisocyanate or a mixture of the isocyanate-functional components with the diol component and blocking agent or a mixture of the isocyanate-functional components may be reacted initially with blocking agent and then with the diol component. In the case of a diol combination, the diol component may, for example, also be divided into two or more portions, for example, also into the individual (cyclo)aliphatic diols.

Once the reaction carried out in the absence of solvents is complete and the reaction mixture has cooled, solid polyurethanes with blocked isocyanate groups and with number average molar masses in the range of 1,500 to 4,000 are obtained. The polyurethanes with blocked isocyanate groups do not require working up and may be used directly as polyurethane resins (B).

The coating composition according to the invention may contain at least one binder (C) with functional groups reactive with the functional groups of (A) and (B). The binders (C) are different from (A) and (B) and comprise, in particular, conventional binders known to the person skilled in the art. Examples are polyester, polyurethane and (meth)acrylic copolymer resins and hybrid binders derived from these classes of binders, for example, with hydroxyl values of, for example, 60 to 300 mg of KOH/g and number-average molar masses of, for example, 500 to 10000. The coating composition according to the invention may contain this binder (C) in amounts in a range up to 50 wt %, optionally, in a range of 1 to 50 wt %, the wt % being based on the total weight of (A), (B) and (C).

The coating compositions of the present invention may further comprise one or more pigments, fillers and/or coating additives, including, but not limited to dyes, fillers, flow control agents, dispersants, thixotropic agents, adhesion promoters, antioxidants, light stabilizers, anticorrosion agents, inhibitors, catalysts, levelling agents, wetting agents, anticratering agents, and mixtures thereof.

The additives are used in conventional amounts known to the person skilled in the art. In case of dual cure coating compositions, generally used photoinitiators are contained therein.

The coating compositions may also contain transparent pigments, color-imparting and/or special effect-imparting pigments and/or fillers, for example, corresponding to a ratio by weight of pigment plus filler:resin solids content in the range from 0:1 to 2:1. Suitable color-imparting pigments are any conventional coating pigments of an organic or inorganic nature. Examples of inorganic or organic color-imparting pigments are titanium dioxide, iron oxide pigments, carbon black, azo pigments, phthalocyanine pigments, quinacridone pigments and pyrrolopyrrole pigments. Examples of special effect pigments are metal pigments, for example, of aluminum, copper or other metals, interference pigments, such as, for example, metal oxide-coated metal pigments, for example, iron oxide-coated aluminum, coated mica, such as, for example, titanium dioxide-coated mica, graphite effect-imparting pigments, iron oxide in flake form, liquid crystal pigments, coated aluminum oxide pigments, coated silicon dioxide pigments. Examples of fillers are silicon dioxide, aluminum silicate, barium sulfate, calcium carbonate and talc.

Under heat the powder coating composition according to the invention show a steep decrease in viscosity in the melting range of its components. The viscosity of the powder coating composition just slightly decreases further by increasing the temperature. The melt viscosity of the powder coating composition of the invention is very low. Measured with a rotational rheometer the minimum melt viscosity is below 30 Pas. Preferred are powder coating compositions of the invention having a melt viscosity of below 10 Pas, particularly below 5 Pas.

The present invention provides a powder coating composition comprising preferably
  (A) 20 to 80 wt % of at least one hydroxyl functional polyurethane resin binder,
  (B) 80 to 20 wt % at least one polyurethane resin as cross-linking agent containing blocked isocyanate groups,
  (C) 0 to 50 wt % and optionally, 1 to 50 wt % of at least one binder different from (A) and (B), having functional groups reactive with the functional groups of (A) and (B), and
  (D) 0.1 to 60 wt % of pigments, fillers and/or coating additives, the wt % amounts based on the total weight of the powder coating composition (A) to (D), wherein the at least one hydroxyl functional polyurethane resin binder (A) and the at least one polyurethane resin (B) both having a melting temperature of 60 to 180° C., in particular, 80 to 160° C.

Particularly preferred is a powder coating composition comprising
  (A) 30 to 70 wt % of at least one hydroxyl functional polyurethane resin binder,
  (B) 70 to 30 wt % at least one polyurethane resin as cross-linking agent containing blocked isocyanate groups,
  (C) 0 to 30 wt % and optionally, 1 to 30 wt % of at least one binder different from (A) and (B), having functional groups reactive with the functional groups of (A) and (B), and
  (D) 1 to 40 wt % of pigments, fillers and/or coating additives, the wt % amounts based on the total weight of the powder coating composition (A) to (D), wherein the at least one hydroxyl functional polyurethane resin binder (A) and the at least one polyurethane resin (B) both having a melting temperature of 60 to 180° C., in particular, 80 to 160° C.

More particularly preferred is a powder coating composition comprising
  (A) 30 to 70 wt % of at least one hydroxyl functional polyurethane resin binder,
  (B) 70 to 30 wt % at least one polyurethane resin as cross-linking agent containing blocked isocyanate groups,
  (C) 0 to 20 wt % and optionally, 1 to 20 wt % of at least one binder different from (A) and (B), having functional groups reactive with the functional groups of (A) and (B), and
  (D) 1 to 40 wt % of pigments, fillers and/or coating additives, the wt % amounts based on the total weight of the powder coating composition (A) to (D), wherein the at least one hydroxyl functional polyurethane resin binder (A) and the at least one polyurethane resin (B) both having a melting temperature of 60 to 180° C., in particular, 80 to 160° C.

The components of the present invention are mixed, extruded and ground by conventional techniques employed in the powder coatings art familiar to a person of ordinary skill in the art. Typically, all of the components of the present powder coating formulation are added to a mixing container and mixed together. The blended mixture is then melt blended, for example, in a melt extruder. The extruded composition is then cooled and broken down and ground to a powder. The ground powder is subsequently screened to achieve the desired particle size, for example, an average particle size (mean particle diameter) of 20 to 200 µm, determined by means of laser diffraction.

It is possible that a predetermined amount of a component of the powder coating components be added, for example, to the polyurethane resin (A) and further components of the composition according to the invention, and then premixed. The premix can then be extruded, cooled, and thereafter pulverized and classified.

The composition according to the invention may also be prepared by spraying from supercritical solutions, NAD "non-aqueous dispersion" processes or ultrasonic standing wave atomization process.

Furthermore, specific components of the powder coating composition according to the invention, for example, additives, pigment, fillers, may be processed with the finished powder coating particles after extrusion and grinding by a "bonding" process using an impact fusion. For this purpose, the specific components may be mixed with the powder coating particles. During blending, the individual powder coating particles are treated to softening their surface so that the components adhere to them and are homogeneously bonded with the surface of the powder coating particles. The softening of the powder particles' surface may be done by heat treating the particles to a temperature, e.g., 40 to 100° C., dependent from the melt behavior of the powder particles. After cooling the mixture the desired particle size of the resulted particles may be proceed by a sieving process.

The powder coating compositions of the present invention can be readily applied to metallic and non-metallic substrates. The compositions of the present invention can be used to coat metallic substrates including, but not limited to, steel, brass, aluminum, chrome, and mixtures thereof, and also to other substrates including, for example, heat-sensitive substrates, such as, substrates based on wood, plastics and paper, and other substrates based, for example, on glass and ceramics.

Depending upon the requirements placed upon the coated substrate, the surface of the substrate may be subjected to a mechanical treatment, such as, blasting followed by, in case of metal substrates, acid rinsing, or cleaning followed by chemical treatment.

The powder coating composition of this invention may be applied by, e.g., electrostatic spraying, electrostatic brushing, thermal or flame spraying, fluidized bed coating methods, flocking, tribostatic spray application and the like, also coil coating techniques, all of which are known to those skilled in the art.

Prior to applying the coating composition of the invention the substrate may be grounded but not pre-heated, so that the substrate is at an ambient temperature of about 25° C. (77° F.).

In certain applications, the substrate to be coated may be pre-heated before the application of the powder composition according to the invention, and then either heated after the application of the powder composition or not. For example, gas is commonly used for various heating steps, but other methods, e.g., microwaves, infra red (IR), near infra red (NIR) and/or ultra violet (UV) irradiation are also known. The pre-heating can be to a temperature ranging from 60 to 260° C. (338 to 500° F.) using means familiar to a person of ordinary skill in the art.

After being applied, the coating can be cured or post-cured by exposing by convective, gas and/or radiant heating, e.g., IR and/or NIR irradiation, as known in the art, to temperatures of, e.g. 100° C. to 300° C. (212 to 572° F.), preferably, 140° C. to 200° C., object temperature in each case, for, e.g., 2 to 20 minutes in case of pre-heated substrates, and, for example, 4 to 30 minutes in case of non-pre-heated substrates.

After being cured, the coated substrate is typically subjected to, for example, either air-cooling, or water quenching to lower the temperature to between, for example, 35 and 90° C. (95 and 194° F.).

The substrate is coated with an effective amount of the present powder coating composition so as to produce a dry film thickness that ranges, for example, from 10 to 300 μm, preferably 20 to 100 μm, particularly from 10 to 50 μm for very thin film coatings.

The powder coating compositions according to the invention can be applied directly on the substrate surface as a primer coating or on a layer of a primer which can be a liquid or a powder based primer. The powder coating compositions according to the invention can also be applied as a coating layer of a multilayer coating system based on liquid or powder coats, for example, as clear coat layer applied onto a color-imparting and/or special effect-imparting base coat layer or as pigmented one-layer coat applied onto a prior coating.

The present invention is further defined in the following Examples. It should be understood that these Examples are given by way of illustration only. From the above discussion and these examples, one skilled in the art can ascertain the essential characteristics of this invention, and without departing from the spirit and scope thereof, can make various changes and modifications of the invention to adapt it to various uses and conditions. As a result, the present invention is not limited by the illustrative examples set forth hereinbelow, but rather is defined by the claims contained hereinbelow.

EXAMPLES

Example 1

Manufacture of Powder Coating Compositions and Application

TABLE 1

| | Formulations | | | |
|---|---|---|---|---|
| Ingredients Formulation A (Invention) | Amount wt % | Ingredients Formulatio B (Prior Art) | Amount wt % | |
| OH Functional Polyurethane Resin, (OH No 252.4, melting temp. 146° C.) | 23.95 | OH Functional Polyurethane Resin | 22.55 | |
| Polyurethane Resin with Blocked NCO groups, NCO-No.: 8.8% 3 functional. melting temp. 129° C. | 48.80 | Crelan NI2 Polysocyanate binder with Blocked NCO groups, amorphous (NCO-No.: 15% 2.2 functional) | 50.20 | |
| TiPure R901 titanium dioxide pigments | 20.00 | TiPure R901 | 20.00 | |
| Levelling agent Byk G5016 | 2.50 | Levelling agent Byk G5016 | 2.50 | |
| Degassing aid Benzoin | 3.25 | Degassing aid Benzoin | 3.25 | |
| Catalyst Crekat (catalyst based on a polyester from Bayer Material Science | 1.50 | Catalyst Crekat | 1.50 | |

The ingredients of each formulation are mixed by a Henschel mixer, and the resulted mixture is extruded.

TABLE 2

| | Extrusion Conditions | |
|---|---|---|
| Extruder | Formulation B (Prior Art) | Formulation A (Invention) |
| Temperature Extruder Zone 0 | 50 | 50 |
| Temperature Extruder Zones 1 to 6 | each zone: 95° C. | each zone: 95° C. |
| Temperature of the melt mixture | 92.5° C. | 94.5° C. |
| Torque | 79% | 50% |
| Dosing rate | 100% | 100% |

The extruded product is then cooled down at room temperature, broken down and grinded to a particle size of about 75 μm. The application of the resulted powder coating composition is proceeded under the known Corona-process onto a metal sheet.

Example 2

Test Results

TABLE 3

| Tests | Formulation B | Formulation A |
|---|---|---|
| Mandrel Test | bad | ok |
| Erichsen Test | 0.3 | >7.5 |
| Flow/Appearance | bad | good |
| Gloss 20° | 65E | 75E |
| Weathering stability | bad | very good |

The test results show excellent properties of the coating based on Formulation A (according to the invention) regarding flexibility, appearance and weather resistance.

What is claimed is:

1. A powder coating composition comprising
   (A) at least one hydroxyl functional polyurethane resin binder, and
   (B) at least one polyurethane resin as cross-linking agent containing blocked isocyanate groups, wherein the at least one hydroxyl functional polyurethane resin binder (A) and the at least one polyurethane resin (B) both have a melting temperature of 60° C. to 180° C., wherein the melting temperatures are the upper end of melting ranges with a breadth of 30° C. to 150° C. and wherein the melting temperatures and the melting ranges are determined by differential scanning calorimetry at heating rates of 10 K/mm, and
   wherein the polyurethane resin (B) is a polyurethane with two blocked isocyanate groups per molecule which is the reaction product of 1,6-hexane diisocyanate with a diol component and with at least one blocking agent in the molar ratio x mol 1,6-hexane diisocyanate:x−1 mol diol component: 2 mol blocking agent, wherein x means a value from 2 to 6.

2. The composition according claim 1 comprising
   (A) 20 to 80 wt % of at least one hydroxyl functional polyurethane resin binder,
   (B) 80 to 20 wt % at least one polyurethane resin as cross-linking agent containing blocked isocyanate groups,
   (C) 0 to 50 wt % of at least one binder different from (A) and (B), having functional groups reactive with the functional groups of (A) and (B), and
   (D) 0.1 to 60 wt % of pigments, fillers and/or coating additives, the wt % amounts based on the total weight of the powder coating composition (A) to (D), wherein the at least one hydroxyl functional polyurethane resin binder (A) and the at least one polyurethane resin (B) both having a melting temperature of 80° C. to 160° C.

3. The composition according to claim 1 wherein the polyurethane resin binder (A) is a polyurethane diol which is the reaction product of 1,6-hexane diisocyanate and a diol component in the molar ratio of x mol 1,6 hexane diisocyanate: (x+1) mol diol component, wherein x means a value from 2 to 6.

4. The composition according to claim 1 wherein the polyurethane resin binder (A) is a polyurethane diol which is the reaction product of a diisocyanate component and a diol component in the molar ratio of x mol diisocyanate component: (x+1) mol diol component, wherein x means a value from 2 to 6, wherein 50 to 80 mol % of the diisocyanate component is formed by 1,6-hexane diisocyanate, and 20 to 50 mol % by one or two diisocyanates, each forming at least 10 mol % of the diisocyanate component and being selected from the group consisting of toluylene diisocyanate, diphenylmethane diisocyanate, dicyclohexylmethane diisocyanate, isophorone diisocyanate, trimethylhexane diisocyanate, cyclohexane diisocyanate, cyclohexanedimethylene diisocyanate and tetramethylenexylylene diisocyanate.

5. The composition according to claim 4 wherein 20-100 mol % of the diol component is formed by at least one linear aliphatic alpha,omega-C2-C12-diol.

6. The composition according to claim 1 wherein the diisocyanate component of polyurethane resin (B) comprises from 50 to 80 mol % of 1,6-hexane diisocyanate and 20 to 50 mol % of one or two diisocyanates, each forming at least 10 mol % of the diisocyanate component and being selected from the group consisting of toluylene diisocyanate, diphenylmethane diisocyanate, dicyclohexylmethane diisocyanate, isophorone diisocyanate, trimethylhexane diisocyanate, cyclohexane diisocyanate, cyclohexanedimethylene diisocyanate and tetramethylenexylylene diisocyanate.

7. A process of coating a substrate comprising the steps
   (a) applying the coating composition of claim 1 on a substrate and
   (b) curing the applied composition.

8. A substrate coated with the powder coating composition according to claim 1.

* * * * *